(12) United States Patent
Tada et al.

(10) Patent No.: US 12,423,040 B2
(45) Date of Patent: Sep. 23, 2025

(54) CONTROL APPARATUS, IMAGE PICKUP SYSTEM, CONTROL METHOD, AND STORAGE MEDIUM

(71) Applicant: CANON KABUSHIKI KAISHA, Tokyo (JP)

(72) Inventors: Takashi Tada, Tochigi (JP); Yumiko Shinozuka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 18/527,718

(22) Filed: Dec. 4, 2023

(65) Prior Publication Data

US 2024/0192907 A1 Jun. 13, 2024

(30) Foreign Application Priority Data

Dec. 8, 2022 (JP) ................................ 2022-196016
Dec. 8, 2022 (JP) ................................ 2022-196018

(51) Int. Cl.
*G06F 3/14* (2006.01)
*G09G 5/00* (2006.01)

(52) U.S. Cl.
CPC ..................... *G06F 3/14* (2013.01)

(58) Field of Classification Search
CPC ........ H04N 23/60; H04N 23/62; H04N 23/66; H04N 23/663; G06F 3/14; G09G 2340/14; G09G 2340/145; G09G 2360/00; G09G 2360/04; G09G 2354/00
See application file for complete search history.

(56) References Cited

U.S. PATENT DOCUMENTS

| | | | | |
|---|---|---|---|---|
| 8,400,506 | B2* | 3/2013 | Oya | H04N 23/66 348/211.6 |
| 11,070,716 | B2* | 7/2021 | Okada | G06F 9/451 |
| 2006/0008175 | A1* | 1/2006 | Tanaka | H04N 7/181 348/E7.086 |
| 2011/0063457 | A1* | 3/2011 | Tokumitsu | H04N 23/661 348/207.11 |
| 2015/0381886 | A1 | 12/2015 | Kato et al. | |
| 2024/0171853 | A1* | 5/2024 | Tahara | H04N 23/60 |

FOREIGN PATENT DOCUMENTS

| | | |
|---|---|---|
| JP | 2012094955 A | 5/2012 |
| JP | 2016012832 A | 1/2016 |

* cited by examiner

*Primary Examiner* — Sardis F Azongha
(74) *Attorney, Agent, or Firm* — ROSSI, KIMMS & McDOWELL LLP

(57) ABSTRACT

A control apparatus is configured to communicate with an imaging unit including a display unit. The control apparatus includes a memory storing instructions, and a processor configured to execute the instructions to communicate with the imaging unit, generate display data for the display unit based on information about display ability of the display unit acquired through communication with the imaging unit, and transmit the display data for the display unit to the imaging unit.

14 Claims, 21 Drawing Sheets

| (A) | (B) | (C) | (D) | (E) |
|---|---|---|---|---|
| INFORMATION STORING APPARATUS ID | OPERATION MEMBER | IS THERE DISPLAY UNIT? | DISPLAY FORMAT | DISPLAY RANGE |
| (1) LENS A | CAMERA, LENS | YES | OCC | V96dots / H384dots |
| (2) LENS B | CAMERA, LENS | YES | OCC | 16 Characters / 2lines |
| (3) CAMERA A | TELE-WIDE SW | YES | OVL | V50dots / H1000dots |
| (4) CAMERA B | VE REMOTE CTRL | YES | OCC | V3000dots / H4000dots |
| (5) ZOOM DEMAND A | ZOOM DEMAND WIRED | YES | OCC | 16 Characters / 4lines |

FIG. 7

| OPERATION MEMBER (A) | LOCATION (B) | FUNCTION (C) |
|---|---|---|
| CAMERA, LENS | NEAR | ANGLE-OF-VIEW ADJUSTMENT FOCUSING LUMINANCE ADJUSTMENT |
| ZOOM OPERATION APPARATUS (WIRED) | NEAR | ANGLE-OF-VIEW ADJUSTMENT |
| ZOOM OPERATION APPARATUS (WLESS) | FAR | ANGLE-OF-VIEW ADJUSTMENT |
| FOCUS OPERATION APPARATUS (WIRED) | NEAR | FOCUSING |
| FOCUS OPERATION APPARATUS (WLESS) | FAR | FOCUSING |
| IRIS OPERATION APPARATUS (WIRED) | NEAR | LUMINANCE ADJUSTMENT |
| IRIS OPERATION APPARATUS (WLESS) | FAR | LUMINANCE ADJUSTMENT |
| VE REMOTE CONTROLLER | FAR | FOCUSING (FINE ADJUSTMENT) LUMINANCE ADJUSTMENT (FINE ADJUSTMENT) |

FIG. 8A

| OPERATION MEMBER (A) | LOCATION (B) | FUNCTION (C) | OPERATOR (D) |
|---|---|---|---|
| CAMERA, LENS | NEAR | ANGLE-OF-VIEW ADJUSTMENT FOCUSING LUMINANCE ADJUSTMENT | OPERATOR A |
| ZOOM OPERATION APPARATUS (WIRED) | NEAR | ANGLE-OF-VIEW ADJUSTMENT | OPERATOR A |
| VE REMOTE CONTROLLER | FAR | FOCUSING (FINE ADJUSTMENT) LUMINANCE ADJUSTMENT (FINE ADJUSTMENT) | OPERATOR B |

FIG. 8B

|  | (A) FUNCTION | (B) DISPLAY ITEM CANDIDATE |
|---|---|---|
| (1) | ANGLE-OF-VIEW ADJUSTMENT | ZOOM POSITION<br>ZOOM COMMAND |
| (2) | FOCUSING | FOCUS POSITION<br>FOCUS COMMAND |
| (3) | LUMINANCE ADJUSTMENT | IRIS POSITION<br>IRIS COMMAND |
| (4) | FOCUSING (FINE ADJUSTMENT) | FOCUS POSITION<br>FOCUS COMMAND |

| | (A) | (B) | (C) | (D) | (E) |
|---|---|---|---|---|---|
| | OPERATION MEMBER | IS THERE DISPLAY UNIT? | DISPLAY FORMAT | DISPLAY RANGE | DISPLAY UNIT |
| (1) | LENS | YES | OCC | V96dots / H384dots | EXTERNAL LENS DISPLAY |
| (2) | LENS | YES | OCC | 16 Characters / 2lines | INTERNAL LENS DISPLAY |
| (3) | CAMERA | YES | OVL | V50dots / H1000dots | CAMERA VF |
| (4) | CAMERA | YES | OCC | V3000dots / H4000dots | EXTERNAL CAMERA DISPLAY |
| (5) | DEMAND | YES | OCC | 16 Characters / 4lines | DEMAND DISPLAY |

FIG. 10A

| (A) DISPLAY UNIT | (B) DISPLAY FORMAT | (C) DISPLAY RANGE | (D) INFORMATION STORING APPARATUS ID |
|---|---|---|---|
| (1) EXTERNAL LENS DISPLAY | OCC | V96dots / H384dots | LENS A |
| (2) INTERNAL LENS DISPLAY | OCC | 16 Characters / 2lines | LENS B |
| (3) CAMERA VF | OVL | V50dots / H1000dots | CAMERA A |
| (4) EXTERNAL CAMERA DISPLAY | OCC | V3000dots / H4000dots | CAMERA B |
| (5) DEMAND DISPLAY | OCC | 16 Characters / 4lines | ZOOM DEMAND A |

FIG. 10B

| (A) DISPLAY UNIT | (B) DISPLAY ITEM CANDIDATE |
|---|---|
| (1) EXTERNAL LENS DISPLAY | ERROR MESSAGE<br>ZOOM POSITION<br>FOCUS POSITION<br>IRIS POSITION<br>ZOOM SPEED |
| (2) INTERNAL LENS DISPLAY | ERROR MESSAGE<br>DEMAND CONNECTION STATE<br>DEMAND PARAMETER |
| (3) CAMERA VF | ERROR MESSAGE<br>ZOOM POSITION<br>ZOOM COMMAND<br>FOCUS POSITION<br>ZOOM SPEED |
| (4) EXTERNAL CAMERA DISPLAY | ERROR MESSAGE<br>ZOOM POSITION<br>ZOOM COMMAND<br>FOCUS POSITION<br>FOCUS COMMAND<br>IRIS POSITION<br>IRIS COMMAND<br>LENS PARAMETER |
| (5) DEMAND DISPLAY | ERROR MESSAGE<br>DEMAND PARAMETER |

FIG. 11

| | (A) | (B) | (C) | (D) | (E) | (F) |
|---|---|---|---|---|---|---|
| | DISPLAY ITEM CANDIDATE | DISPLAY FORMAT | DISPLAY RANGE | DISPLAY ITEM | DISPLAY CONFIGURATION | INFORMATION STORING APPARATUS ID |
| (1) | Err00<br>IrisFol :2.8<br>ZoomFol :150<br>FocusFol :300<br>ZoomSp :80 | OCC | V96dots / H384dots | Err00<br>IrisFol :2.8<br>ZoomFol :150<br>FocusFol :300 | 4(R)×2(C)<br>8CHARACTERS | LENS A |
| (2) | ERROR MESSAGE<br>ZOOM POSITION<br>ZOOM COMMAND<br>FOCUS POSITION<br>ZOOM SPEED | OVL | V50dots / H1000dots | ERROR MESSAGE<br>ZOOM POSITION | 2(R)×1(C)<br>47CHARACTERS<br>OVERLAID POSITION:<br>{(0, 0), (20, 100)} | CAMERA A |
| (3) | ERROR MESSAGE<br>DEMAND<br>PARAMETER | OCC | 16 Characters / 2lines | ERROR MESSAGE<br>DEMAND<br>PARAMETER | 2(R)×1(C)<br>16CHARACTERS | ZOOM DEMAND A |

FIG. 12

| | (A) INFORMATION STORING APPARATUS ID | (B) OPERATION MEMBER | (C) IS THERE DISPLAY UNIT? | (D) DISPLAY FORMAT | (E) DISPLAY RANGE | (F) EXISTING DISPLAY CONFIGURATION |
|---|---|---|---|---|---|---|
| (1) | LENS A | CAMERA, LENS | YES | OCC | V96dots / H384dots | - |
| (2) | LENS B | CAMERA, LENS | YES | OCC | 16 Characters / 2lines | - |
| (3) | CAMERA A | TELE-WIDE SW | YES | OVL | V50dots / H1000dots | OCC DISPLAY RANGE: H4000, V3000 ZOOM RELATIVE POSITION: {(0, 0), (21, 80)} FOCUS RELATIVE POSITION: {(21, 3920), (21, 3000)} APERTURE POSITION: {(3994, 2984), (4000, 3000)} |
| (4) | CAMERA B | VE REMOTE CONTROLLER | YES | OCC | V3000dots / H4000dots | - |
| (5) | ZOOM DEMAND A | ZOOM DEMAND WIRED | YES | OCC | 16 Characters / 4lines | - |

FIG. 14

| | (A) OPERATION MEMBER | (B) IS THERE DISPLAY UNIT? | (C) DISPLAY FORMAT | (D) DISPLAY RANGE | (E) EXISTING DISPLAY CONFIGURATION | (F) DISPLAY UNIT |
|---|---|---|---|---|---|---|
| (1) | CAMERA, LENS | YES | OCC | V96dots / H384dots | - | EXTERNAL LENS DISPLAY |
| (2) | CAMERA, LENS | YES | OCC | 16 Characters / 2lines | - | INTERNAL LENS DISPLAY |
| (3) | TELE-WIDE SW | YES | OVL | V50dots / H1000dots | OCC DISPLAY RANGE: H4000, V3000 ZOOM RELATIVE POSITION: {(0, 0), (21, 80)} FOCUS RELATIVE POSITION: {(21, 3920), (21, 3000)} APERTURE POSITION: {(3994, 2984), (4000, 3000)} | CAMERA VF |
| (4) | VE REMOTE CONTROLLER | YES | OCC | V3000dots / H4000dots | - | EXTERNAL CAMERA DISPLAY |
| (5) | ZOOM DEMAND WIRED | YES | OCC | 16 Characters / 4lines | - | DEMAND DISPLAY |

FIG. 16A

| | (A) DISPLAY UNIT | (B) DISPLAY FORMAT | (C) DISPLAY RANGE | (D) EXISTING DISPLAY CONFIGURATION | (E) INFORMATION STORING APPARATUS ID |
|---|---|---|---|---|---|
| (1) | EXTERNAL LENS DISPLAY | OCC | V96dots / H384dots | - | LENS A |
| (2) | INTERNAL LENS DISPLAY | OCC | 16 Characters / 2lines | - | LENS B |
| (3) | CAMERA VF | OVL | V50dots / H1000dots | OCC DISPLAY RANGE: H4000, V3000 ZOOM RELATIVE POSITION: {(0, 0), (21, 80)} FOCUS RELATIVE POSITION : {(21, 3920), (21, 3000)} APERTURE POSITION: {(3994, 2984), (4000, 3000)} | CAMERA A |
| (4) | EXTERNAL CAMERA DISPLAY | OCC | V3000dots / H4000dots | - | CAMERA B |
| (5) | DEMAND DISPLAY | OCC | 16 Characters / 4lines | - | ZOOM DEMAND A |

FIG. 16B

| (A) DISPLAY ITEM CANDIDATE | (B) DISPLAY FORMAT | (C) DISPLAY RANGE | (D) DISPLAY ITEM OF ANOTHER APPARATUS | (E) DISPLAY ITEM | (F) INFORMATION STORING APPARATUS ID |
|---|---|---|---|---|---|
| (1) ZOOM POSITION ZOOM COMMAND ZOOM SPEED | OVL | 16Characters /1line | DEMAND STATE ZOOM OPERATION AUTHORITY ZOOM POSITION ZOOM COMMAND | ZOOM SPEED | CAMERA A |

FIG. 17

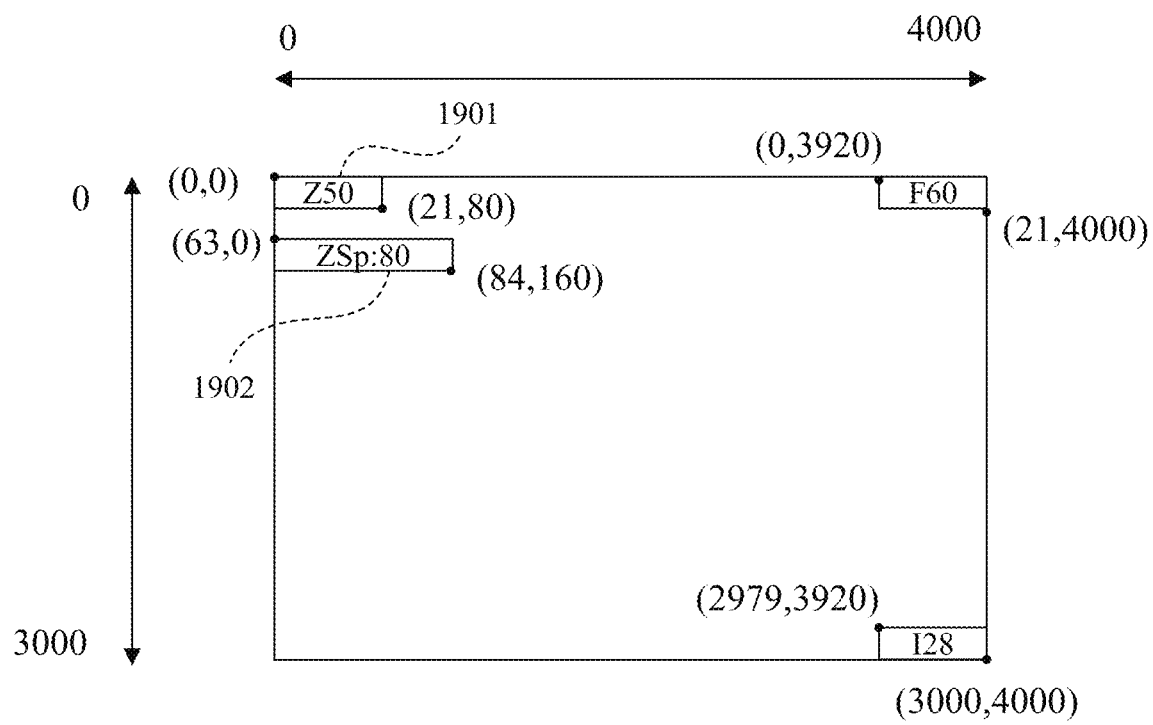
FIG. 18
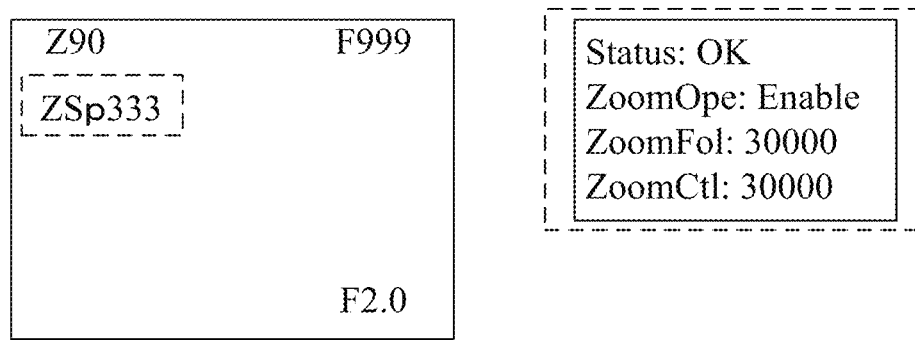
FIG. 19A
FIG. 19B

| OPERATION MEMBER (A) | LOCATION (B) | PRIORITIZED FUNCTION (C) | | OPERATOR (D) |
|---|---|---|---|---|
| CAMERA, LENS | NEAR | 1 | FOCUSING | OPERATOR A |
| | | 2 | LUMINANCE ADJUSTMENT | |
| | | 3 | ANGLE-OF-VIEW ADJUSTMENT | |
| ZOOM OPERATION APPARATUS (WIRED) | NEAR | 3 | ANGLE-OF-VIEW ADJUSTMENT | OPERATOR A |
| VE REMOTE CONTROLLER | FAR | 1 | FOCUSING (FINE ADJUSTMENT) | OPERATOR B |
| | | 2 | LUMINANCE ADJUSTMENT (FINE ADJUSTMENT) | |

FIG. 22A

| OPERATION MEMBER (A) | LOCATION (B) | PRIORITIZED FUNCTION (C) | | OPERATOR (D) |
|---|---|---|---|---|
| CAMERA, LENS | NEAR | 1 | ANGLE-OF-VIEW ADJUSTMENT | OPERATOR A |
| | | 2 | FOCUSING | |
| | | 3 | LUMINANCE ADJUSTMENT | |
| ZOOM OPERATION APPARATUS (WIRED) | NEAR | 1 | ANGLE-OF-VIEW ADJUSTMENT | OPERATOR A |
| VE REMOTE CONTROLLER | FAR | 1 | FOCUSING (FINE ADJUSTMENT) | OPERATOR B |
| | | 2 | LUMINANCE ADJUSTMENT (FINE ADJUSTMENT) | |

FIG. 22B

CONTROL APPARATUS, IMAGE PICKUP SYSTEM, CONTROL METHOD, AND STORAGE MEDIUM

BACKGROUND

Technical Field

One of the aspects of the embodiments relates to a control apparatus, an image pickup system, a control method, and a storage medium.

Description of Related Art

Japanese Patent Application Publication No. 2016-012832 discloses a camera apparatus (control apparatus) that specifies its function (role) based on its specified imaging condition. Japanese Patent Application Publication No. 2012-094955 discloses a camera apparatus (control apparatus) that measures its position and displays an image based on surrounding information about its position while overlaying (superimposing) it on a live-view image.

Information necessary for a user observing a display apparatus of an image pickup system may not be displayed on the display apparatus. This is unsuitable in terms of the operability of an imaging unit (unit that is used for imaging) operable by the user.

The control apparatus disclosed in Japanese Patent Application Publication Nos. 2016-012832 and 2012-094955 are demanded to be more beneficial in the operability of the imaging unit.

SUMMARY

A control apparatus according to one aspect of the embodiment is configured to communicate with an imaging unit including a display unit. The control apparatus includes a memory storing instructions, and a processor configured to execute the instructions to communicate with the imaging unit, generate display data for the display unit based on information about display ability of the display unit acquired through communication with the imaging unit, and transmit the display data for the display unit to the imaging unit. Alternatively, the control apparatus includes a memory storing instructions, and a processor configured to execute the instructions to communicate with the imaging unit, generate display data for the display unit based on information about an operation of the imaging unit acquired through communication with the imaging unit, and transmit the display data for the display unit to the imaging unit. An image pickup system having each control apparatus also constitutes another aspect of the embodiment. A control method corresponding to each control apparatus also constitutes another aspect of the embodiment. A storage medium storing a program that causes a computer to execute the above control method also constitutes another aspect of the embodiment.

Further features of the disclosure will become apparent from the following description of embodiments with reference to the attached drawings.

BRIEF DESCRIPTION OF THE DRAWINGS

FIG. 7 illustrates an example of identification (ID) information in the first embodiment.

FIGS. 8A to 8C illustrate examples of a function table and function information in the first embodiment.

FIG. 9 illustrates an example of a function and a display item candidate in the first embodiment.

FIGS. 10A and 10B illustrate examples of a table for specifying a display unit and specific display unit information in the first embodiment.

FIG. 11 illustrates an example of a table for determining a display item candidate from the display unit in the first embodiment.

FIG. 12 illustrates an example of display content determined from the display item candidate and display performance according to the first embodiment.

FIG. 14 illustrates an example of ID information in a second embodiment.

FIGS. 16A and 16B illustrate examples of a display unit specifying table and specific display unit information in the second embodiment.

FIG. 17 illustrates an example of a display content item determined from the display content of another apparatus in the second embodiment.

FIG. 18 illustrates an example of the configuration of display content determined from the existing display configuration according to the second embodiment.

FIGS. 19A and 19B illustrate examples of a UI according to the second embodiment.

FIGS. 22A and 22B illustrate examples of function priority in the third embodiment.

DESCRIPTION OF THE EMBODIMENTS

Figure 1:
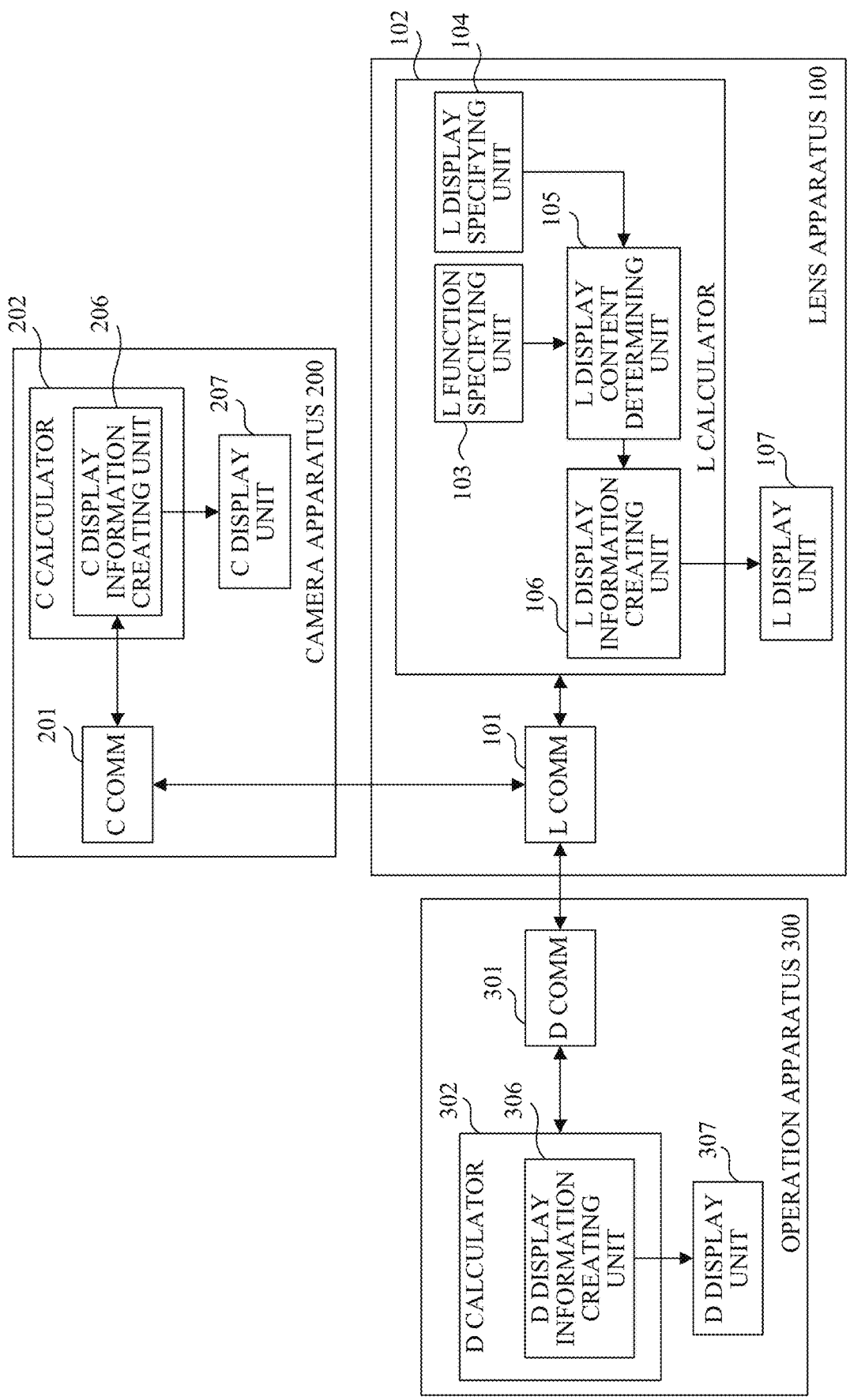
FIG. 1 is a block diagram of an image pickup system according to each embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

A description will now be given of problems of a conventional image pickup system that includes a control apparatus such as a lens apparatus and at least one display apparatus communicable with the control apparatus. The information transmitted and received between devices in the image pickup system includes images and video information, and since it is assumed that a general video information transmission and communication protocol is available, menu information such as device status and settings may not be applicable. The image pickup system may include a plurality of connected display apparatus (external UI) having a display unit other than a lens, such as an accessory for operating a camera VF and a lens, and a display dedicated apparatus such as a monitor and a tablet. Recently, due to the diversification of imaging applications, devices connected to the lens are also diversified. Simply displaying predetermined information on a communicably connected display apparatus may not provide necessary information for a photographer, for example.

The image pickup system involves a variety of functions such as a photographer who operates a camera and a lens, a video engineer (VE) who adjusts a camera and a variety of video devices, and a switcher who switches between screens in video production.

In the imaging environment, a variety of UIs may be configured in a variety of places such as the camera VF, camera accessories, lenses, lens accessories, and VEs and switchers. Especially recently, the number of devices connectible to PCs and tablets is increasing, and these devices are sometimes used as the UI of the image pickup system.

Depending on these various display apparatuses, the optimal display items are different. For example, a photographer needs information about an imaging operation, but a VE or switcher needs information about the entire system. A display format and information suitable for each type of UI is different. For example, a large display unit is more suitable for list display. Since video is displayed for the VF, superimposed displays of a lot of information will negatively affect imaging.

Depending on the camera or other IFs, there are communicable information and uncommunicable information. Whether or not the information is communicable may depend on the product generation or the firmware version. In any case, duplicate information display may be avoided between communicably connected devices while necessary information is displayed.

For effective imaging by improving the operability, the display of the external UI may be always necessary for a person viewing the UI. These UIs are to have a display format that matches the UI display ability, and information that matches the function of the person viewing the UI in the entire image pickup system and the type of the UI itself.

Therefore, an information storing apparatus (storage apparatus or memory) configured to store the information may be able to specify a display unit of a communicably connected device, and determine the content to be displayed on the external UI based on the specified information.

Each embodiment will be described in detail below.

First Embodiment

Referring now to FIG. 1, a description will be given of an image pickup system 10 according to a first embodiment. FIG. 1 is a block diagram of the image pickup system 10. The image pickup system 10 includes a lens apparatus 100, a camera apparatus (image pickup apparatus) 200, and an operation apparatus 300. However, this embodiment is not limited to this example, and other units such as a display-dedicated apparatus or a VE system may be connected to the lens apparatus 100. In this embodiment, the lens apparatus 100 serves as an information storing apparatus (control apparatus), the camera apparatus 200, and the operation apparatus 300 serve as external UIs (units including a display apparatus (display unit)). In this embodiment, the operation apparatus 300 is, for example, an accessory for operating the zoom lens of the lens apparatus 100, but is not limited to this example.

A description will now be given of the lens apparatus 100. The lens apparatus 100 includes an L communication unit (L COMM) 101, an L calculator (processor) 102, and an L display unit 107. The lens apparatus 100 includes a lens unit (zoom lens, focus lens), an aperture stop, an operation unit (none of which is illustrated), and the like. The L communication unit 101 is a communication device that communicates with another communicably connected device such as the camera apparatus 200 and the operation apparatus 300. The L communication unit 101 transmits data input from the L calculator 102 to the other communicably connected device, and outputs received data from the other communicably connected device to the L calculator 102. In this embodiment, the L communication unit 101 outputs at least identification (ID) information received from the other communicably connected device to the L calculator 102. The L communication unit 101 also outputs C display data, which will be described below, to the camera apparatus 200 and outputs D display data to the operation apparatus 300.

The L calculator 102 is a control unit such as a CPU, and includes at least an L function specifying unit 103, an L display specifying unit 104, an L display content determining unit 105, and an L display information creating unit 106. The L calculator 102 also outputs L display data, which will be described below, to the L display unit 107, and outputs display data other than the L display data (C display data, D display data) to the L communication unit 101 (transmits display data to the camera apparatus 200 or the operation apparatus 300).

The L function specifying unit 103 performs function specifying processing that specifies a function (user's type) of the user (operator or photographer) operating each device in the image pickup system 10 including the lens apparatus 100. More specifically, the L function specifying unit 103 specifies the function (function information) of the operator based on the identification (ID) information on each device (each unit) input from the L communication unit 101. The ID information includes information about an operation by the operator. The specified function information is handled by the L display content determining unit 105. A detailed processing flow of the function specifying processing will be described below with reference to FIG. 3. The term "function" function information will also be discussed below with reference to FIGS. 8A, 8B, and 8C.

In the image pickup system 10 including the lens apparatus 100, the L display specifying unit 104 performs display specifying processing that specifies display information such as whether there is a display unit in each apparatus (the presence or absence of the display unit) and the display ability of the display unit based on the ID information on each device input from the L communication unit 101. The specified display information is handled by the L display content determining unit 105. A detailed processing flow of the display specifying processing will be described below with reference to FIG. 4.

The L display content determining unit 105 determines what to display on which display unit in the image pickup system 10 based on only the display unit specified by the L display specifying unit 104 or a combination of the function information specified by the L function specifying unit 103 and the display information specified by the L display specifying unit 104. More specifically, display content determining processing is performed which determines the content to be displayed on the target external UI and the own UI (L display unit 107). The determined display content information is handled by the L display information creating unit 106. A detailed processing flow of the display content determining processing will be described below with reference to FIG. 4.

The L display information creating unit 106 performs display information creating processing for creating display data to be displayed on the external UI based on the display content information determined by the L display content determining unit 105. The L display information creating unit 106 creates, for example, C display data to be displayed on the camera apparatus 200 and D display data to be displayed on the operation apparatus 300, and outputs them to the L communication unit 101. A detailed processing flow of the display information creating processing will be described below with reference to FIG. 5. The L display information creating unit 106 creates not only display data for the external UI but also L display data to be displayed on the L display unit 107, which will be described below. The created L display data is output to the L display unit 107.

The L display unit 107 is a display device, and is a UI that can be at least visually recognized by a user, and displays the L display data input from the L calculator 102. The display device includes LCD, organic EL, or the like, but is not limited to these examples. In this embodiment, the lens apparatus 100 may not have the L display unit 107.

A description will now be given of the camera apparatus 200. The camera apparatus 200 is an image pickup apparatus having an imaging unit, a C communication unit (C COMM) 201, a C calculator 202, and a C display unit 207. The C communication unit 201 is a communication device that communicates with another communicably connected device such as the lens apparatus 100. The C communication unit 201 transmits the data input from the C calculator 202 to the other communicably connected device and outputs the received data from the other communicably connected device to the C calculator 202. In this embodiment, the C communication unit 201 outputs at least the C display data received from the lens apparatus 100 to the C calculator 202. The C communication unit 201 also outputs the ID information input from the C calculator 202 to the lens apparatus 100.

The C calculator 202 is a control unit such as a CPU, and has at least a C display information creating unit 206. The C calculator 202 outputs the C display data input from the C communication unit 201 to the C display unit 207 and outputs its ID information to the C communication unit 201. The C display information creating unit 206 converts the C display data input from the C communication unit 201 into display data in accordance with the display format of the C display unit 207 and outputs the display data to the C display unit 207. The C display unit 207 is a display device and is a UI that can be at least visually recognized by the user, such as a camera VF. The C display unit 207 displays the display data converted by the C display information creating unit 206. The display device includes LCD, organic EL, or the like, but is not limited to these examples.

A description will now be given of the operation apparatus 300. The operation apparatus 300 is an apparatus for operating the lens apparatus 100 and is used, for example, to operate a zoom lens and a focus lens (not illustrated) in the lens apparatus 100. The operation apparatus 300 includes a D communication unit (D COMM) 301, a D calculator 302, and a D display unit 307. In this embodiment, the operation apparatus 300 is an operation apparatus that can operate the focus lens in the lens apparatus 100, but is not limited to this example, and may be an operation apparatus that can operate other members such as the zoom lens.

The D communication unit 301 is a communication device that communicates with another communicably connected device such as the lens apparatus 100. The D communication unit 301 transmits data input from the D calculator 302 to the other communicably connected device, and outputs received data from the other communicably connected device to the D calculator 302. In this embodiment, the D communication unit 301 outputs at least the D display data received from the lens apparatus 100 to the D calculator 302. The D communication unit 301 also outputs the ID information input from the D calculator 302 to the lens apparatus 100.

The D calculator 302 is a control unit such as a CPU. The D calculator 302 outputs the D display data input from the D communication unit 301 to the D display unit 307 and outputs its ID information to the D communication unit 301. The D calculator 302 has a D display information creating unit 306 and converts data into display data having a format suitable for a D display unit 307, which will be described below. The D display unit 307 is a display device and is a UI that can be at least visually recognized by the user. The D display unit 307 displays the display data converted by the D display information creating unit 306. The display device includes LCD, organic EL, or the like, but is not limited to these examples.

Figure 2:
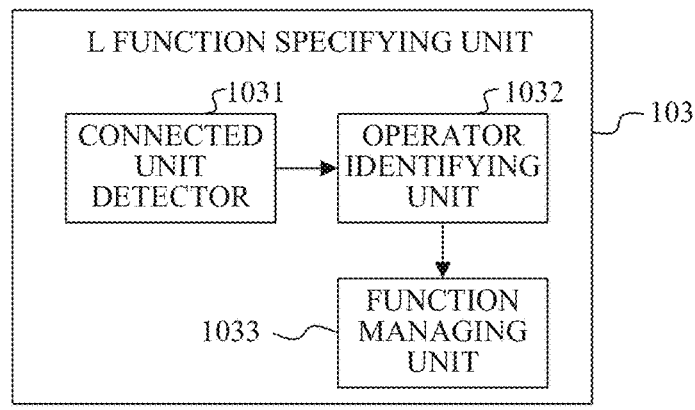
FIG. 2 is a block diagram of an L function specifying unit according to a first embodiment.

Referring now to FIG. 2, a description will be given of the L function specifying unit 103. FIG. 2 is a block diagram of the L function specifying unit 103. The L function specifying unit 103 includes a connected unit detector 1031, an operator identifying unit 1032, and a function managing unit 1033.

The connected unit detector 1031 detects a unit (unit of the image pickup system 10) connected to the lens apparatus 100 based on the ID information acquired from the L communication unit 101. The connected unit detector 1031 transmits the ID information about the unit (operation member) connected to the lens apparatus 100 to the operator identifying unit 1032. The ID information is information for identifying "what" operation member the lens apparatus 100 is connected to. For example, in a case where the ID information indicates the camera apparatus 200, it is the camera apparatus, and in a case where the ID information indicates the operation apparatus 300, it is the operation apparatus. Details of the ID information will be described below with reference to FIG. 7. The L function specifying unit 103 may store ID information about various information storing apparatuses, specify the type of connected information storing apparatus based on terminal voltage information and communication information between the apparatuses, and specify the ID information based on the type of the specified information storing apparatus.

The operator identifying unit 1032 identifies a positional relationship between the operation apparatus 300 and the lens apparatus 100 from the connected operation member (unit) using a function table, which will be described below. For example, the operator identifying unit 1032 assumes that an operation member located close to the lens apparatus 100 is determined to be operated by a single operator, and an operation member located far from the lens apparatus 100 is determined to be operated by a different operator than the operator located near the lens apparatus 100. As described above, the operator identifying unit 1032 identifies a group of operators and operation members, and registers the operation member, location, and operator in the function information. The function information is transmitted to the function managing unit 1033. The function table is stored in an unillustrated nonvolatile memory and can be referenced from anywhere by the L function specifying unit 103. Although details will be described below with reference to FIGS. 8A to 8C, the function table is a list of information storing apparatuses to which the connected unit detector 1031 may be previously connected. The function table illustrates, for each information storing apparatus, information on a positional relationship with the lens apparatus, and information indicating the function of the person operating the information storing apparatus during imaging.

The function managing unit 1033 specifies the function of the operator based on the function of the operation member using the function table described below. For example, in a case where a zoom demand or a focus demand is connected, the operator's function is to adjust the angle of view or provide focusing. The specified function is registered in the function information. The registered function information is transmitted to the L display content determining unit 105.

Figure 3:
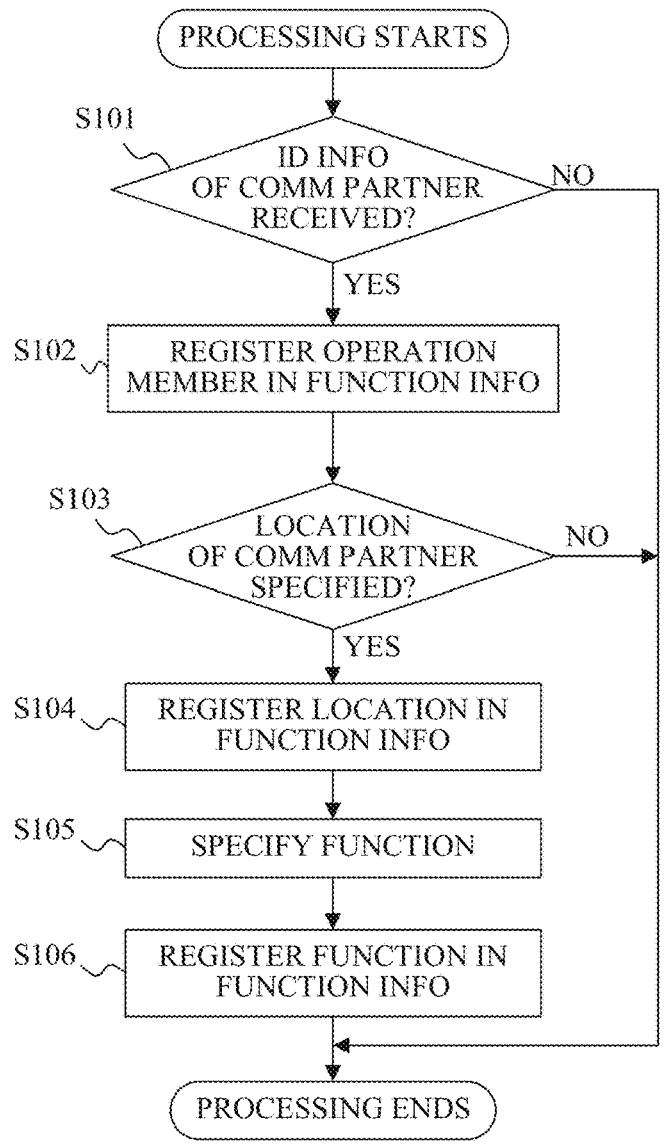
FIG. 3 is a flowchart illustrating function specifying processing according to the first embodiment.

Referring now to FIG. 3, a description will be given of the function specifying processing performed by the L function specifying unit 103 according to this embodiment. FIG. 3 is a flowchart illustrating the function specifying processing. First, in a case where the lens apparatus 100 is powered on and then communicatively connected to the camera apparatus 200 or the operation apparatus 300, the flow proceeds to step S101. In the following description, the lens apparatus 100 is communicably connected to the operation apparatus 300.

First, in step S101, the connected unit detector 1031 determines whether or not ID information has been received from the communication (connection) partner (operation apparatus 300). In a case where the ID information is received, the flow proceeds to step S102. On the other hand, in a case where the ID information has not been received, that is, in a case where the communication partner does not store the ID information, the flow ends.

In step S102, the connected unit detector 1031 registers the operation member in the function information based on the ID information, and transmits the function information to the operator identifying unit 1032. The function managing unit 1033 specifies the function of the operator based on the information registered in the function information by the connected unit detector 1031 and the operator identifying unit 1032.

Next, in step S103, the operator identifying unit 1032 determines whether the location of the communication partner (operation apparatus 300) has been specified. In a case where it is determined that the location of the communication partner has been specified, the flow proceeds to step S104. On the other hand, in a case where it is determined that the location of the communication partner cannot be specified, the flow ends. The location is, for example, the distance between the lens apparatus 100 and the communication partner, the connection type such as wired or wireless, and the like. However, this embodiment is not limited to this example, and may use any information that indicates the positional relationship with the lens apparatus 100 within the image pickup system 10. The location is specified using the function table that represents the relationship among the operation members, locations, and functions. A detailed description of this specifying method will be given with reference to FIGS. 8A to 8C. In a case where there is no connected operation member in the function table, the function cannot be specified and thus this flow ends.

In step S104, the operator identifying unit 1032 registers the location in the function information, and transmits the function information in which the location has been registered to the function managing unit 1033. Next, in step S105, the function managing unit 1033 specifies the function of the operator based on the operation member and the location (information about the operator's operation). Referring to FIG. 7, a detailed description will be given of the specified function, but for example, it is "angle-of-field adjustment." Next, in step S106, the function managing unit 1033 registers the function specified in step S105 in the function information, and the flow ends. Similar processing can be performed for the camera apparatus 200 as well.

Figure 4:
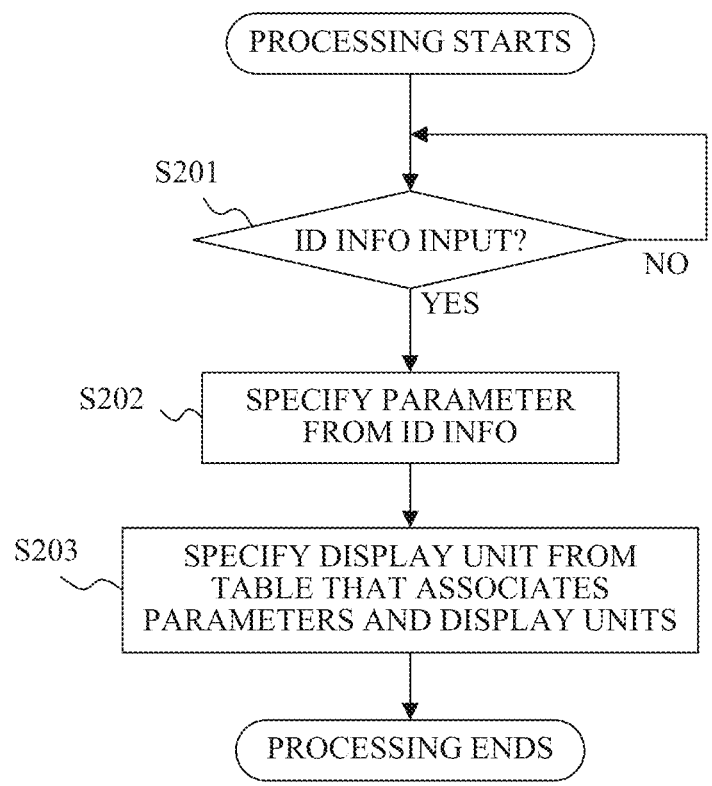
FIG. 4 is a flowchart illustrating display specifying processing according to the first embodiment.

Referring now to FIG. 4, a description will be given of the display specifying processing performed by the L display specifying unit 104 according to this embodiment. FIG. 4 is a flowchart illustrating the display specifying processing. First, in a case where the lens apparatus 100 is powered on and then communicably connected with the camera apparatus 200 or the operation apparatus 300, the flow proceeds to step S201. In the following description, the lens apparatus 100 is communicably connected to the camera apparatus 200.

First, in step S201, the L display specifying unit 104 determines whether ID information has been input from the communication (connection) partner (camera apparatus 200) (whether the lens apparatus 100 has received the ID information). In a case where it is determined that the ID information has been input, the flow proceeds to step S202. On the other hand, in a case where it is determined that no ID information has been input, step S201 is repeated. In a case where the ID information indicates information about the camera apparatus, it is the camera apparatus 200, and in a case where the ID information indicates information about the operation apparatus, it is the operation apparatus 300, and the ID information includes information that allows the lens apparatus 100 to identify the display unit that can be used, and the display format or display range of the display unit. More specifically, as will be described below, for example, the ID information includes information about the "operation member," "is there a display unit?" "display format," or "display range" illustrated in FIG. 7, or information that can be used to identify the display ability of the display unit (information about the display ability of the display unit, for example, information about the display range of the display unit). However, this embodiment does not limit the ID information to this example, and may use other information.

In step S202, the L display specifying unit 104 determines whether the communication partner (camera apparatus 200) has a display unit based on the ID information, and registers it in the specific display unit information. In a case where the L display specifying unit 104 can determine whether there is a display unit based on the ID information, it makes the determination using the ID information. In a case where the L display specifying unit 104 cannot determine whether there is a display unit based on the ID information, it may make the determination using the preset condition and setting. The specific display unit information includes information (parameter) on the type, display format, or display ability of the specified display unit. More specifically, as will be described below, for example, there is a "display unit," "display format," or "display range" as illustrated in FIG. 10B, which is information that can be used to identify the location and display ability of the display unit, although this embodiment is not limited to this example.

Next, in step S203, the L display specifying unit 104 specifies the display format and display ability of the display unit of the communication partner (camera apparatus 200) from the ID information and registers it in the specific display unit information (specifies the display unit based on a table that associates the parameters and display units). The L display specifying unit 104 outputs the specific display unit information to the L display content determining unit 105, and the flow ends. Similar processing can be performed on the operation apparatus 300 as well.

Figure 5:
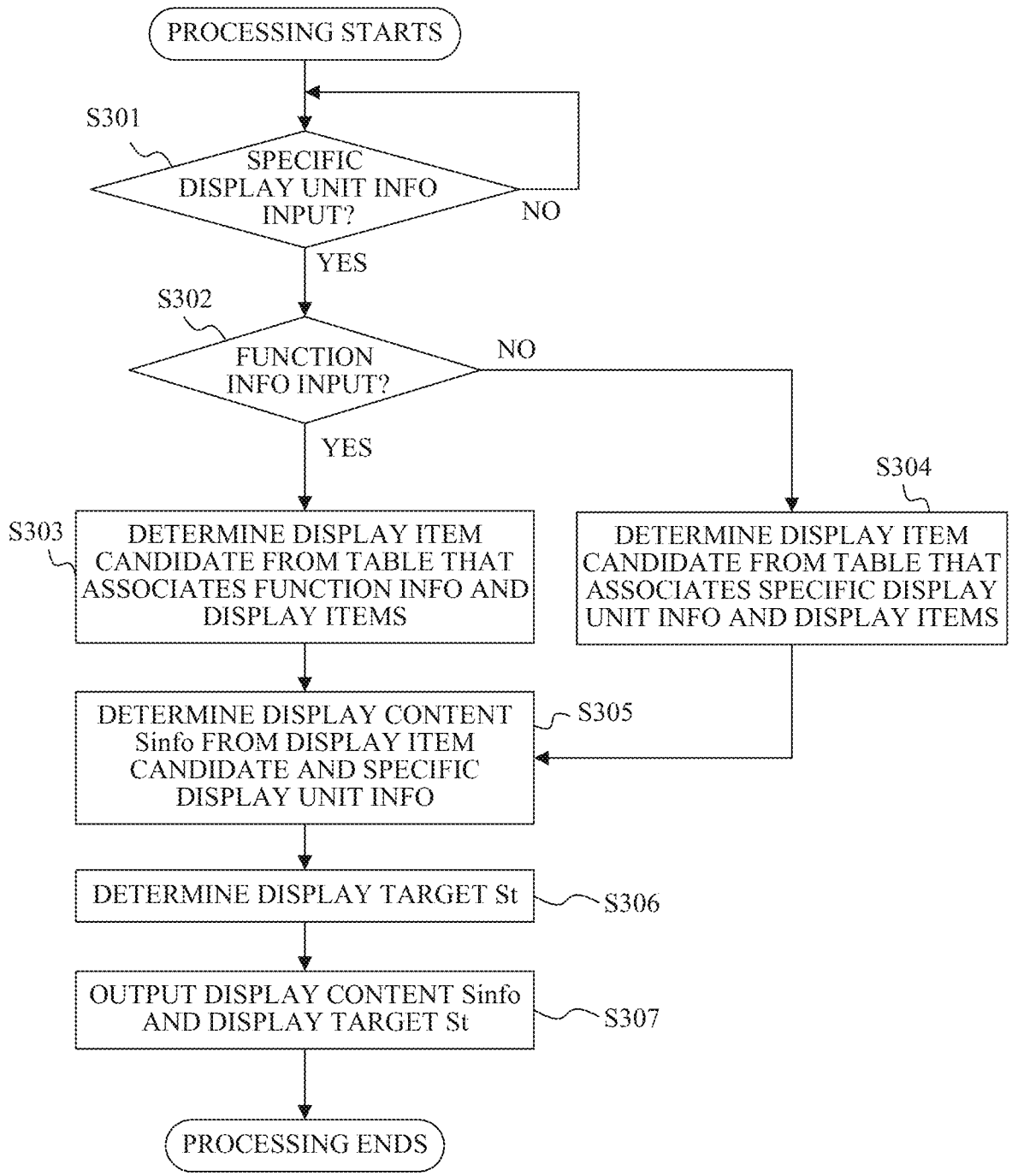
FIG. 5 is a flowchart illustrating display content determining processing according to the first embodiment.

Referring now to FIG. 5, a description will be given of the display content determining processing (display target determining processing) performed by the L display content determining unit 105 according to this embodiment. FIG. 5 is a flowchart illustrating display content determining processing (display target determining processing). In the following description, the content of the C display data to be transmitted to the camera apparatus 200 is determined.

First, in step S301, the L display content determining unit 105 determines whether specific display unit information has been input. In a case where specific display unit information is input, the flow proceeds to step S302. On the other hand, in a case where the specific display unit information has not been input, step S301 is repeated.

In step S302, the L display content determining unit 105 determines whether function information has been input. In a case where it is determined that the function information has been input, the flow proceeds to step S303. On the other hand, in a case where it is determined that the function information has not been input, the flow proceeds to step S304. In step S303, the L display content determining unit 105 determines a display item candidate based on the table that associates the function information and display items. A method for determining display item candidates based on the function information will be described below. In step S304, the L display content determining unit 105 selects the display item candidate based on the table that associates the specific display unit information and display items (for example, a table that associates information about the display capacity of the display unit with the content of display data). A method for determining the display item candidate based on the specific display unit information will be described below.

In step S305, the L display content determining unit 105 determines and creates display content SInfo_c based on the display item candidate and the specific display unit information. A description will now be given of a method for determining display content based on a display item candidate and specific display unit information. The display content SInfo_c is information representing the display content for the camera apparatus 200 according to this embodiment.

Next, in step S306, the L display content determining unit 105 performs display target determining processing to determine and generate display target St_c for displaying the display content SInfo_c. In the display target determining processing, the L display content determining unit 105 refers to the specific display unit information and determines the display target St_c according to the information storing apparatus ID. The display target St_c is information indicating that the camera apparatus 200 according to this embodiment is the display target. Next, in step S307, the L display content determining unit 105 outputs the display content SInfo_c and the display target St_c, and the flow ends.

The operation apparatus 300 is processed in accordance with the flow of steps S301 to S304 described above. However, the display content SInfo_d is determined in step S305, and the display target St_d is determined in step S306. For example, the display information SInfo_d created for the operation apparatus 300 may be different from or equal to the display information SInfo_d created for the camera apparatus 200.

Figure 6:
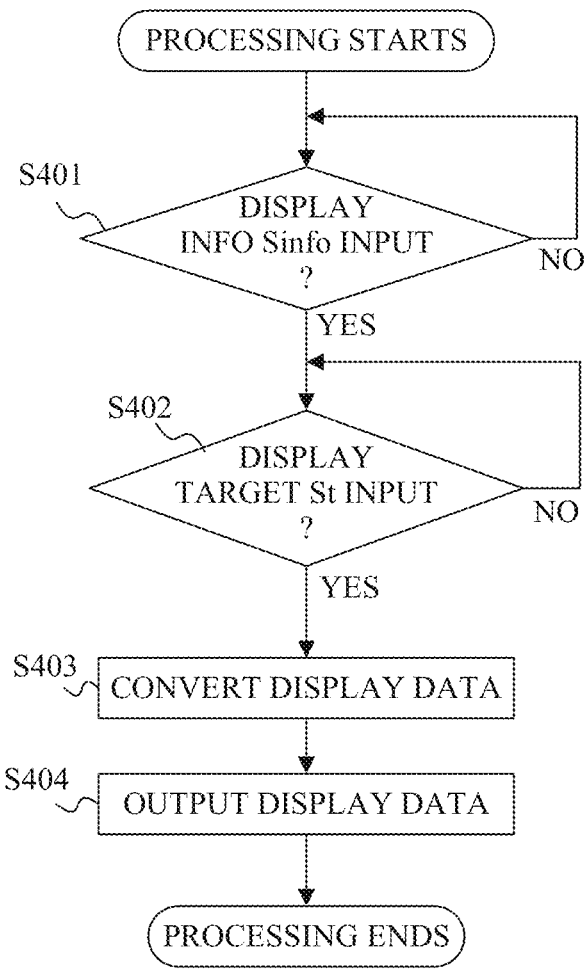
FIG. 6 is a flowchart illustrating display information creating processing according to the first embodiment.

Referring now to FIG. 6, a description will be given of the display information creating processing performed by the L display information creating unit 106 according to this embodiment. FIG. 6 is a flowchart illustrating display information creating processing. In the following description, C display data to be transmitted to the camera apparatus 200 is created. In a case where the display content determining processing in FIG. 5 is finished and a display information creation request is made to the L display information creating unit 106, this flow starts and proceeds to step S401.

First, in step S401, the L display information creating unit 106 determines whether the display content SInfo_c determined in the display content determining processing has been input. In a case where it is determined that the display content SInfo_c has been input, the flow proceeds to step S402. On the other hand, in a case where it is determined that the display content SInfo_c has not been input, step S401 is repeated.

In step S402, the L display information creating unit 106 determines whether the display target St_c determined in the display content determining processing has been input. In a case where it is determined that the display target St_c has been input, the flow proceeds to step S403. On the other hand, in a case where it is determined that the display target St_c has not been input, step S402 is repeated.

In step S403, the L display information creating unit 106 creates C display data that is converted by a format that can be displayed into the display target St_c based on the display content SInfo_c acquired in step S401 and the display target St_c acquired in step S402. More specifically, what kind of data is required by the destination display unit can be determined from information about the display apparatus stored in an unillustrated memory using the information about the display target St_c. It can be understood from the display target St_C that it is the camera apparatus 200, and from the camera apparatus 200, it can be understood that the display unit can display by inputting ASCII data. Although ASCII data is used in this embodiment, this embodiment is not limited to this example. For example, in a case where the display apparatus is the same as the lens apparatus 100, data may be converted into output data to match the display apparatus. In a case where information on the number of display pixels can be obtained, information such as whether each display pixel is turned on or off may be output. Information that can specify the display data may be transmitted and received as ID information, and included in the specific display unit information by the display specifying unit, and converted into display data using it for the display information creating processing.

Next, in step S404, the L display information creating unit 106 outputs the C display data created in step S403 to the L communication unit 101, and this flow ends.

Figure 13A:
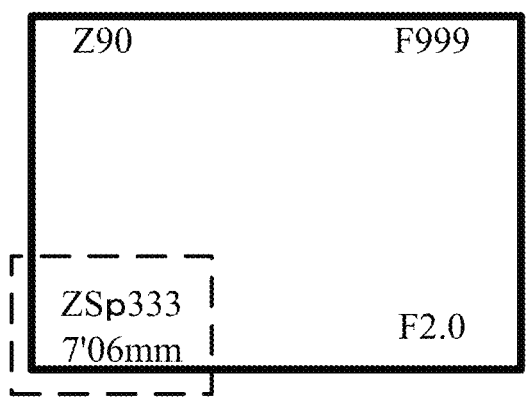
FIGS. 13A and 13B illustrate examples of a user interface (UI) according to the first embodiment.
Figure 13B:
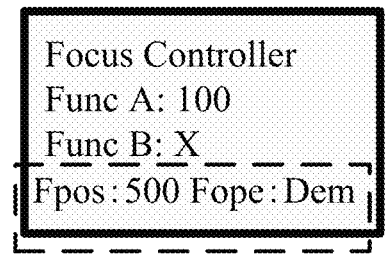

The operation apparatus 300 is processed in accordance with the flow of steps S401 to S404 described above. However, D display data is created in step S403, and the D display data is output to the L communication unit 101 in step S404. The camera apparatus 200 displays the C display data received from the lens apparatus 100 on the C display unit 207. The operation apparatus 300 displays the D display data received from the lens apparatus 100 on the D display unit 307. Referring to FIGS. 13A and 13B, a description will be given of actual display by this processing.

Referring now to FIG. 7, a detailed description will be given of the ID information. FIG. 7 illustrates an example of the ID information. In FIG. 7, information in columns (A) to (E) illustrates examples of ID information stored in the information storing apparatus.

Column (A) is an identifier for identifying that a certain apparatus is a unique information storing apparatus. Column (B) illustrates an operation member connected to the image pickup system 10. Column (C) indicates the presence or absence of a display unit (whether there is a display unit). "Yes" means that the information storing apparatus has a display unit, and "No" means that it does not have a display unit. Column (D) illustrates the display format in a case where the user device uses the provided display unit. "Occupied (OCC)" means that the entire display screen of the display unit can be occupied, and "overlaid (OVL)" (superimposed) means that a partial range of the display screen of the display unit can be used. Column (E) illustrates a display range of the display unit that can be used. For example, "vertically (V) 96 dots/horizontally (H) 384 dots" means that the vertical and horizontal dimensions of the screen are in units of dots, and "16 characters/2 lines" means that 16 characters (letters) can be displayed in each of two lines (rows). For example, in a case where ID information can be obtained from information storing apparatus zoom demand A through communication, it is understood that it has an operation member as a zoom operation apparatus (wired), and it can be used for function identification in the function specifying processing described below. From columns (C) to (E), the presence or absence of a display unit and display performance of the display unit can be determined, and can be used to specify the display unit in the display specifying processing to be described below.

Figures 8C, 9:
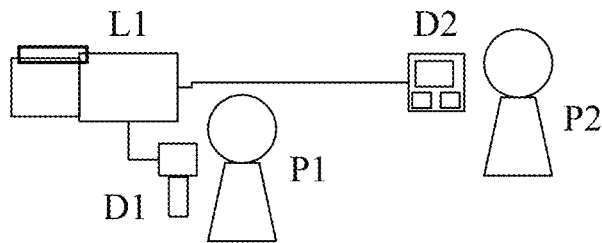

Referring now to FIGS. 8A to 8C, a description will be given of an example of function specifying processing according to this embodiment. FIG. 8A is a function table, and FIG. 8B illustrates an example of function information. The function specifying processing is processing performed by the L function specifying unit 103 to specify the function of the operator who operates the operation member.

A description will now be given of the function table illustrated in FIG. 8A. The function table is a table for specifying the function of the operator from the operation member. Column (A) in FIG. 8A represents an operation member connected to the image pickup system 10. Column (B) in FIG. 8A represents a location from the lens apparatus 100. From the lens apparatus 100, wire-connected elements are located close to the lens (NEAR), and wirelessly connected elements are located distant from the lens (FAR). The VE remote control is used to provide focusing and adjust the luminance of the lens away from the lens apparatus 100 and is remotely located. This embodiment will describe as an example a method of determining the location while previously associating it with the operation member, but may use a method of automatically specifying the location of the operation member using GPS, etc., or a method of setting the location by the user using an unillustrated setting unit. In this embodiment, there are two types of locations: close to the lens and remote from the lens, but a plurality of types of locations may be defined for the purpose of specifying the number of operators and their respective locations.

A description will now be given of the function of column (C) in FIG. 8A. Imaging is carried out by various people, each with their functions, including the camera operator who drives the lens to adjust the angle of view and provide focusing, and the VE who provides fine focusing by moving the focus. Column (C) in FIG. 8A represents the function of the operator, which can be considered based on the function of the operation member that is used for imaging. The function is not limited to this example, and since it differs depending on the imaging mode, the user may be able to register it.

A description will now be given of function specifying processing using the function information illustrated in FIG. 8B. Referring now to FIG. 8C, a description will now be given of the function specifying processing in a case where camera and lens L1, zoom operation apparatus (wired) D1, and VE remote controller D2 are connected to the image pickup system 10, and there are operators P1 and P2. The function information is information about the function of the operator specified from the connected unit. First, the camera, lens, zoom operation apparatus (wired), and VE remote controller connected to the operation members of the function information are registered. In this case, by referring to column (B) in FIG. 8A, it is specified that the camera, lens, and zoom operation apparatus (wired) are located close to the lens (NEAR), and the VE remote controller is located distant from the lens (FAR). A location near the lens and a location distant from the lens are registered in the function information location.

By referring to column (C) in FIG. 8A, the function corresponding to the operation member is registered in the function information. Next, by referring to the location of the registered function information in FIG. 8B, it is specified that one operator (operator A) is located near the lens and another operator (operator B) is located distant from the lens. Operators A and B are registered as operators of the function information. Therefore, by performing the function specifying processing described above, the function of the operator can be specified.

Referring now to FIG. 9, a description will be given of the determination of a display item candidate using the table that associates the function information and corresponding items. FIG. 9 illustrates an example of functions and display item candidates, and illustrates a correspondence table for determining, based on the function information, a proper display item candidate for the operator who has that function. This has the purpose of determining a display item candidate that is proper for the function of the operator having the function information.

Column (A) illustrates functions of operators, and column (B) illustrates candidates for display items corresponding to column (A). For example, in a case where the function is angle-of-view adjustment, the display item candidate can be determined to include a zoom position and a zoom command value from the table. For example, in a case where the function is focusing, the display item candidate can be determined to include information about focusing of the system, such as a focus position, a focus command value, and a depth of field. In a case where the function is luminance adjustment, the display item candidate can be determined to include information about a state relating to the luminance of the system, such as an aperture position, an aperture command value, a camera gain, exposure time, and filter settings.

The table that associates the function information and corresponding items may be stored in advance in an unillustrated memory, or may be made changeable by providing an unillustrated changing unit. For example, a display unit and an operation unit (not illustrated) may be provided so that the user can directly edit the table.

Referring now to FIGS. 10A and 10B, a description will be given of an example of the display specifying processing according to this embodiment. The purpose of the display specifying processing is to specify the display unit of the information storing apparatus from the information about the display unit among the ID information acquired from the information storing apparatus, and to create specific display unit information that is used in the display content determining processing. FIG. 10A is a table for specifying a display unit from part of the ID information described with reference to FIG. 7. Columns (A) to (D) in FIG. 10A are similar to columns (B) to (E) in FIG. 7, respectively. Column (E) indicates the type of display unit specified from the information in columns (A) to (D). FIG. 10B illustrates an example of the specific display unit information specified by the display specifying processing. Column (A) in FIG. 10B illustrates the type of display unit specified by the display specifying processing. Columns (B) and (C) in FIG. 10B are similar to columns (D) and (E) in FIG. 7, respectively. Column (D) in FIG. 10B is similar to column (A) in FIG. 7. These are acquired as information about display performance from the ID information in the display specifying processing.

A description will be given of an example of display specifying processing performed by the L display specifying unit 104 in a case where a camera, a lens, a zoom operation apparatus (wired), and a VE remote controller are connected to the image pickup system 10. First, the ID information is acquired, and a matching combination is specified by referring to columns (A) to (D) in FIG. 10A regarding an operation member, whether there is a display unit, a display format, and a display range included in the ID information. Next, the display unit is specified by referring to the column (E) of the specified combination. For example, in a case where the acquired ID information is a combination of a lens, a display unit present, occupied, 96 dots vertically/384 dots horizontally, it is understood that the matching columns (A) to (D) are row (1) in FIG. 10A. Therefore, the display unit can be specified as an "external lens display" from column (E) in the table. Next, specific display unit information illustrated in FIG. 10B is created from the specified display unit and information about the display performance included in the ID information.

As described above, the display unit can be specified using the ID information about the connected device and the table, and specific display unit information can be created by adding it to information about the display performance in the ID information. By creating the specific display unit information in this way, the lens apparatus 100 according to this embodiment can determine a display item candidate and display content using the specific display unit information, which will be described below.

Referring now to FIG. 11, a description will be given of processing for determining a display item candidate using the specific display unit information and table of corresponding items. The purpose of the processing of determining a display item candidate is to determine a proper (or optimal) display item candidate for each specified display unit included in the specific display unit information. FIG. 11 is a correspondence table for determining a proper display item candidate for the display unit from the display unit item included in the specific display unit information.

In FIG. 11, column (A) indicates the identified display unit, and column (B) indicates display item candidates corresponding to column (A). For example, if the display unit is an "external lens display," a matching row is searched from rows (1) to (5) of the display unit in column A of the table, and it is understood that it matches row (1). By referring to the corresponding display item candidates (B), the display item candidate can be determined as "error message," "zoom position," "focus position," "aperture position," and "zoom speed."

The table that associates the specific display unit information and corresponding items may be previously stored in an unillustrated memory, or may be made changeable by providing an unillustrated changing unit. For example, a display unit and an operation unit (not illustrated) may be provided so that the user can directly edit the table.

Referring now to FIG. 12, a description will be given of processing for determining display content based on the display item candidate and specific display unit information. The display content determining processing includes display item determination in which items to be actually displayed are selected from the display item candidate based on the specific display unit information and the display format or display ability of the display unit. The display content determining processing further includes a display configuration determination that determines where on the screen of the display unit a display item is to be displayed, according to the display format or display ability of the display unit.

FIG. 12 illustrates an example of display content determined from the display item candidate and display performance. Column (A) illustrates a display item candidate determined by the L display content determining unit 105. Columns (B) and (C) are similar to columns (D) and (E) in FIG. 7, respectively. Column (D) illustrates a display item determined from the display item candidate through the display content determining processing. Column (E) illustrates a display configuration determined according to the display format or display ability of the display unit. Column (F) is similar to column (A) in FIG. 7.

In rows (1) to (3) in FIG. 12, display contents are determined from different display unit information. For example, row (1) illustrates information for determining display content from the display unit information about the L display unit 107 provided in the lens apparatus 100. Row (2) corresponds to the C display unit 207 provided in the camera apparatus 200, and row (3) corresponds to the D display unit 307 provided in the operation apparatus 300 as a demand apparatus.

The notation of columns (A) and (D) in row (1) will be supplementally described. The notation in the table is originally expressed as the item name to be displayed as illustrated in rows (2) and (3), but for simple description, the characters that are actually displayed on the display are deliberately used. For example, in rows (2) and (3), "Err00" is displayed instead of "error message." The content of row (1) will be described below as an example.

The display item candidate "Err00" in column (A) in FIG. 12 corresponds to "error message" in another row, and indicates the presence or absence of an error in the information storing apparatus. "Err00" means that there is no error in the image pickup system 10 according to this embodiment. Next, "ApertureFol:2.8" corresponds to "aperture position" and indicates how much the aperture stop of the image pickup system 10 is open. "ZoomFol:150" corresponds to "zoom position" and indicates how many millimeters an angle of view of the image pickup system 10 is. "FocusFol:300" corresponds to "focus position" and indicates an object distance of the image pickup system 10 in meters. "ZoomSp:80" corresponds to "zoom speed" and indicates what percentage of the maximum zoom change speed of the image pickup system 10 is.

A description will now be given of the determination of a display item. A display item candidate in column (A) in FIG. 12 is determined by the method described with reference to FIG. 11. In a case where a display apparatus has a display range, the display items that can be displayed are limited. Thus, the display items that can be displayed are determined based on the number of characters necessary to display the display item candidate and a displayable range. Generally, display apparatuses express horizontal and vertical display ranges in dots (also called pixels), and express images by turning on and off one dot. A description will now be given of row (1) as an example. For example, assume that the display item candidate "Error Message" is actually displayed as five characters "Err00." One character is 20×20 [dots], and in a case where a space is provided between characters, it can be expressed as 21×21 [dots]. Therefore, it is understood that 5 characters×21×21 dots=105×21 dots are required. Next, in a case where the display range is 96 dots vertically and 384 dots horizontally, the vertical is 96÷21≈4, and it can be determined that 4 vertical characters can be displayed. The width is 384÷21≈18, and it can be determined that 18 horizontal characters can be displayed.

These results show that in a case where one item is simply displayed per row for the display unit that can display 4 characters vertically and 18 characters horizontally, only 4 items out of 5 display item candidates can be displayed. Hence, display items can be determined by adjusting the number of displayable items from the display item candidates using the display range information.

A description will now be given of the determination of the display configuration. The display configuration may display the determined display items in any way within the display range, but this embodiment makes determination so that one item per row is arranged from the top in the display item candidates, as in the first line of FIG. 13B. In a case where there are items and values corresponding to the items, the configuration may be such that they are displayed in separate columns as in the fourth line of FIG. 13B. The display configuration in column (E) in FIG. 12 illustrates the determined content as to how the determined display items are displayed on the display unit. However, regarding the display configuration, the determined display items may be enlarged and displayed to fill the screen, or the items may simply be displayed consecutively from the top of the screen. The content explained in this embodiment is merely illustrative and is not limited.

The above configuration can determine display items from the display range from the corresponding item candidates based on the specific display unit information, and determine how the display items are displayed in the display range.

Referring now to FIGS. 13A and 13B, a description will be given of an example of a UI displayed on the external UI according to this embodiment. FIG. 13A illustrates an example of the C display unit 207, and FIG. 13B illustrates an example of the D display unit 307. A broken line in FIG. 13A indicates C display data, and a broken dotted line in FIG. 13B indicates D display data, which are provided for explanation purposes and are not actually displayed. As illustrated, this embodiment provides information within the broken lines. The C display data displays information necessary for "focusing," "angle-of-view adjustment," and "luminance adjustment," and illustrates the zoom speed information and object distance as an example. The display data was limited to two lines so as not to interfere with video display confirmation. The D display data displays information necessary for a "focus operator," and illustrates the focus position information and focus operation authority information as an example.

Since the above configuration can specify the function and display unit of the communicably connected device and determine the content to be displayed on the external UI based on the specified information, the display on the external UI is always necessary information for a viewer of the UI. Even if the display ability of the display unit in the operation apparatus 300 is changed, as long as the information on the display unit can be identified, the display of the external UI can be changed according to the display ability. The above processing can display on the external UI information corresponding to the function of the communicably connected device and the display unit.

This embodiment illustrates the example illustrated in FIGS. 8A to 8C for the function information, but the function information is not limited to this example. Regarding the display information, this embodiment uses ID information such as the presence or absence of a display unit and display ability, but this embodiment is not limited to this example. For example, the display information may be information such as whether or not transmission and reception of the C display data are supported, or setting information for the display unit of each device. If the setting information for the display unit can be acquired, display may be possible depending on the setting, but the display information output from the lens apparatus 100 can be changed depending on whether or not it is actually displayed.

In the display content determining processing, this embodiment monitors the communication information with the communication partner, and uses information that is not actually communicated as the display content, but this embodiment is not limited to this example. For example, information such as an abnormal state is information that the user wants to recognize, even if it overlaps the screen, and the display content may be determined in consideration of the display settings described above.

This embodiment automatically determines the specifications of the function and display unit based on the information acquired from each device, but this embodiment is not limited to this example. For example, the operator may directly set the function. The function may be specified in relation to the operator's lens setting contents (based on information about the operator's unit settings). For example, in a case where a focus driving range is limited, focusing may be used as the function. The function or the display unit itself may be made settable, or the priority order for determining the display content may be made settable. This embodiment specifies the function based on the functions of all connected operation members, but may specifies one function based on the operation state of the operation member. For example, in a case where a state in which the zoom demand is being operated is detected as the operation state, the function is the angle-of-view adjustment.

This embodiment sets the trigger for starting the function specifying processing, the display specifying processing, the display content determining processing, and the display information creating processing to a communication connection with another communicably connected device, but the trigger is limited to this example. For example, the trigger may be a switch operation within the image pickup system 10, or these processes may not be performed in conjunction. This embodiment always displays the C display data, but is not limited to this example. For example, the C display data may be displayed only while a switch to which the additional information display function is assigned is operated.

This embodiment mainly outputs the display information created by the display information creating processing to the external UI, but its L display unit 107 may be the target. In this embodiment, the lens apparatus 100 performs the function specifying processing, display specifying processing, display content determining processing, and display information creating processing, but this embodiment is not limited to this example. At least part of the above processing may be performed, for example, by the camera apparatus 200 or the operation apparatus 300.

This embodiment can display the necessary information in the optimal location for the photographer, according to the function of the photographer and the specified display unit.

Second Embodiment

A description will now be given of a second embodiment. The first embodiment determines the display content based only on the type of display unit specified in the display specifying processing. However, it may be improper for the operator to display duplicate information within a limited display range. If information is displayed and superimposed on a video while the existing display configuration is ignored, data with different properties may be arranged and the display becomes difficult to view. Accordingly, this embodiment will describe an example in which the display contents do not duplicate by creating the display content of the display unit based on the display content of another display unit that has already been created. The display content to be superimposed (overlaid) is determined using the existing display configuration in consideration of the existing display.

The basic configuration of the image pickup system according to this embodiment is the same as that of the image pickup system 10 according to the first embodiment described with reference to FIG. 1, and thus a description of the configuration and operation common to the first embodiment will be omitted. In this embodiment, the L display specifying unit 104 creates the specific display unit information illustrated in FIG. 15 using the ID information added to the configuration information about the existing display, as illustrated in FIG. 14. After first determining the display content (content of display data) to be displayed on the operation apparatus 300, the L display content determining unit 105 determines the display content to be displayed on the camera apparatus 200 so as not to duplicate the display content of the operation apparatus 300.

The L display specifying unit 104 performs display specifying processing for specifying display information in which the existing display configuration is newly added to the configuration of the first embodiment among the ID information about each device input from the L communication unit 101. Detailed processing of the display specifying processing using the existing display configuration will be described below. The L display content determining unit 105 refers to the already determined display content of a certain apparatus (such as the operation apparatus (demand apparatus) 300) and performs display content determining processing for determining display content of another apparatus (such as the camera apparatus 200) for the first embodiment. The detailed processing flow of the display content determining processing of the other apparatus based on the already determined display content of the certain apparatus will be described below.

Figure 15:
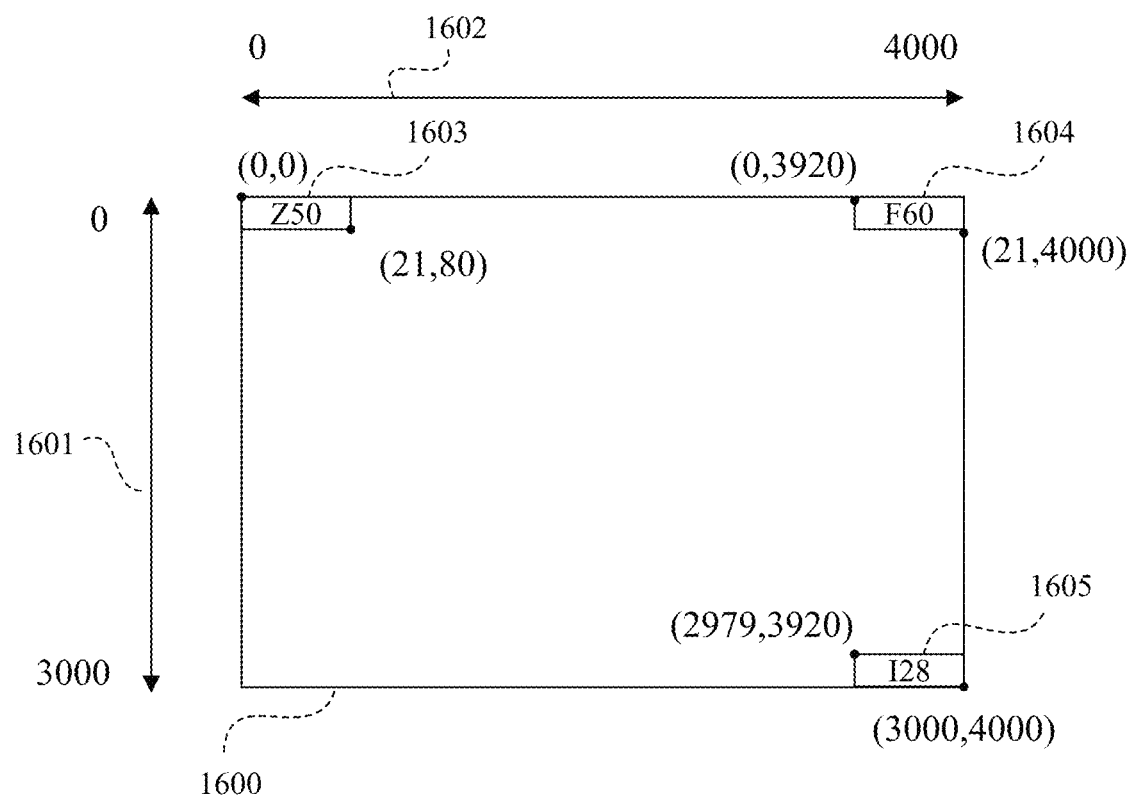
FIG. 15 illustrates an example of an existing display configuration according to the second embodiment.

Referring now to FIGS. 14 and 15, a detailed description will be given of the ID information. FIG. 14 illustrates an example of the ID information stored in the information storing apparatus. Columns (A) to (E) in FIG. 14 are similar to columns (A) to (E) in FIG. 7, respectively. Column (F) in FIG. 14 illustrates the display content (existing display configuration) originally displayed by the display unit of the information storing apparatus.

FIG. 15 illustrates (an example of an existing display configuration) the display content of a display unit in a certain information storing apparatus. A rectangle 1600 at the center indicates the display screen of the display unit, and straight lines 1601 and 1602 on the outside indicate the size of the display screen. This means in coordinates that the entire display range is 0 to 4000 horizontally and 0 to 3000 vertically. A rectangle 1603 indicates a zoom relative position, and indicates that the starting coordinates of the display position are set to (0, 0) and the ending coordinates are set to (21, 80). A rectangle 1604 indicates a focus relative position, and indicates that the starting coordinates of the display position are set to (0, 3920) and the ending coordinates are set to (21, 4000). A rectangle 1605 indicates an aperture position, and indicates that the starting coordinates of the display position are set to (2979, 3920) and the ending coordinates are set to (3000, 4000).

A detailed description will now be given of each item of the existing display configuration (F) in the third row of FIG. 14. "Display range during occupancy: 4000 horizontally and 3000 vertically" indicates the entire display range of the display unit in the information storing apparatus (A), and corresponds to the rectangle 1600 in FIG. 15. The "zoom relative position: {(0, 0), (21, 80)}" corresponds to the rectangle 1603. The "focus relative position: {(21, 3920), (21, 3000)}" and the "aperture position: {(3994, 2984), (4000, 3000)}" also correspond to rectangles 1604 and 1605, respectively. In other words, each item of the existing display configuration (F) represents the content that a certain information storing apparatus is displaying on its display unit. Thus, once the existing display configuration (F) is known, the original display content displayed by the display unit in the information storing apparatus (A) can be recognized.

Referring now to FIGS. 16A and 16B, a description will be given of an example of the display specifying processing according to this embodiment. Using the ID information including the existing display configuration, this embodiment creates, as the existing display configuration, specific display unit information for specifying which information is written at which position on the display screen in each display apparatus detected by the lens apparatus.

FIG. 16A is a table (display unit specifying table) for specifying the display unit from part of the ID information described with reference to FIG. 14. The existing display configuration described with reference to FIG. 14 has been added to FIG. 10A. Columns (A) to (E) in FIG. 16A are similar to columns (B) to (F) in FIG. 14, respectively. Column (F) in FIG. 16A indicates the type of display unit specified from the information in columns (A) to (E). FIG. 16B illustrates an example of specific display unit information specified by the display specifying processing. Column (A) in FIG. 16B indicates the type of display unit specified by the display specifying processing. Columns (B) and (C) in FIG. 16B are similar to columns (D) and (E) in FIG. 14, respectively, and are acquired as information about display performance from the ID information in the display specifying processing.

A description will now be given of an example of display specifying processing performed by the L display specifying unit 104 in a case where a camera, a lens, a zoom operation apparatus (wired), and a VE remote controller are connected to the image pickup system 10. First, the L display specifying unit 104 acquires the ID information, and specifies a matching combination of an operation member (A), the presence or absence of a display unit (B), a display format (C), a display range (D), and an existing display configuration (E) included in the ID information, by referring to columns (A) to (E) in FIG. 16A. Next, the L display specifying unit 104 specifies the display unit by referring to the column (F) of the specified combination. For example, in a case where the acquired ID information indicates a combination of tele-wide switch, display presence, superimposed, 50 dots vertically/1000 dots horizontally, it is understood that the matching columns (A) to (E) are row (3) in FIG. 16A. Thus, the display unit can be specified from the "Camera VF" in column (F) in the table. Thus, by collecting some of the information specified from the ID information, specific display unit information about the certain display unit and its performance can be created, as illustrated in FIG. 16B.

As described above, specific display unit information including the existing display configuration can be specified by specifying the display unit from the ID information about the connected apparatus using the table and by collecting information about the display performance.

Referring now to FIG. 17, a description will be given of determining a display content item from a display item candidate, specific display unit information, and previously determined display content of another display apparatus. This embodiment considers already determined display content for another apparatus in determining a display item to be actually displayed from display item candidates. For example, in a case where the display content of the operation apparatus (demand device) 300 has already been determined, the display item of the camera apparatus 200 is determined from the display content of the operation apparatus 300 so that their display contents do not duplicate.

FIG. 17 illustrates an example of a display content item determined from the display content of another apparatus, and illustrates information necessary to determine the display item. Column (A) in FIG. 17 illustrates a display item candidate determined by the L display content determining unit 105. Columns (B) and (C) in FIG. 17 are similar to columns (D) and (E) in FIG. 14, respectively. Column (D) in FIG. 17 illustrates a display item of another display unit that has already been determined. Column (E) in FIG. 17 illustrates a display item determined from the display item candidate by determining that it is not included in column (D) among the items in column (A) through display content determining processing. Column (F) in FIG. 17 is similar to column (A) in FIG. 14.

A description will now be given of row (1) in FIG. 17 as an example. A description will now be given of the determination of a display item. Display item candidate (A) is determined by the method described with reference to FIGS. 16A and 16B. In this embodiment, the display range (C) is "16 characters/1 line." This indicates that there is a display range for one line of 16 characters. Thus, if the display range for the three determined items in the display item candidate (A) is limited to 16 characters per line and only one item can be displayed per line, all display item candidates cannot be displayed. Next, in a case where the display item candidate (A) is compared with four items in the display item (D) for the other apparatus, it is understood that the display item that has not yet been displayed is "zoom speed." Based on this information, the display item that exists in column (A) but does not exist in column (D) can be determined to be the "zoom speed" illustrated in column (E).

Referring now to FIG. 18, a description will be given of determining the display configuration using the determined display item and the existing display configuration. This embodiment determines the configuration of the display content so that the existing display by newly considering the existing display configuration approaches relevant information. For example, in determining a display configuration that displays and superimposes information on the camera apparatus 200, the display configuration is determined to superimpose the display in a nearby location based on the existing display already displayed on the camera apparatus 200.

FIG. 18 illustrates an example of the configuration of the display content determined from the existing display configuration, and illustrates a screen in a case where a determined display item zoom speed is located near the existing zoom relevant display for the existing display configuration of the camera VF as the display unit in FIG. 16B. By referring to the "zoom relative position {(0, 0), (21, 80)}" included in the existing display configuration, it is understood that zoom-related information is located at the position of rectangle 1901 illustrated in FIG. 18. Based on this information, the display item "zoom speed" as the same zoom-related information can be placed at the position of rectangle 1902. This configuration can determine a display content configuration that displays a relevant display item using the existing display configuration.

Referring now to FIGS. 19A and 19B, a description will be given of an example of the UI displayed on the external UI according to this embodiment. FIG. 19A illustrates an example of the C display unit 207, and FIG. 19B illustrates an example of the D display unit 307. A broken line in FIG. 19A indicates C display data, and a broken line in FIG. 19B indicates D display data, which are added for description purposes and are not actually displayed. This embodiment provides information within the broken lines as illustrated. The display item is determined so that the C display data and the D display data do not duplicate, and displayed so that the display content configuration approaches the relevant data using the existing display structure of the ID information. As a result, this display is excellent for the operator who checks the display.

In an example according to this embodiment, the lens apparatus 100 includes the function specifying unit, display specifying unit, display content determining unit, and display information creating unit, but this embodiment is not limited to this example. At least one of them may be provided to the camera apparatus 200 or operation apparatus 300.

Third Embodiment

A description will now be given of a third embodiment. In an example according to the first embodiment, all identified functions are equally assigned to the operators. On the other hand, in an example according to this embodiment, in a case where a plurality of functions exist, priorities are given to the functions. This embodiment will omit a description on the same configuration or operation as that of the first embodiment.

Figure 20:
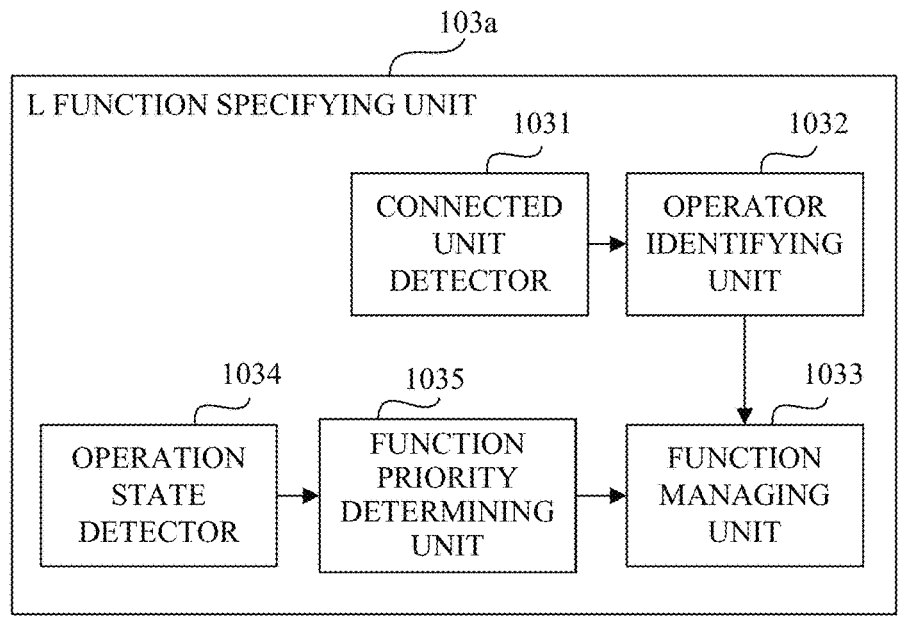
FIG. 20 is a block diagram of an L function specifying unit according to a third embodiment.

Referring now to FIG. 20, a description will be given of the L function specifying unit 103a according to this embodiment. FIG. 20 is a block diagram of the L function specifying unit 103a. The L function specifying unit 103a according to this embodiment is different from the L function specifying unit 103 according to the first embodiment in that the L function specifying unit 103a includes an operation state detector 1034 and a function priority determining unit 1035. Other configurations of the L function specifying unit 103a are the same as those of the L function specifying unit 103, and a description thereof will be omitted.

In addition to the function information in the first embodiment, the function managing unit 1033 manages the priority of the functions. More specifically, the function managing unit 1033 dynamically manages the priority of the functions based on information from function priority determining unit 1035. Details regarding the priority of functions will be described below with reference to FIGS. 22A and 22B.

The operation state detector 1034 detects that the operation member is being operated by the operator, and notifies the function priority determining unit 1035 of operation member information indicating which operation member has been operated. The operation state detector 1034 detects that the operation is being made, based on a command value for driving an unillustrated lens of the lens apparatus 100 from the D communication unit 301 or an operation of an illustrated operation unit of the lens apparatus 100. Upon receiving the notification from the operation state detector 1034, the function priority determining unit 1035 notifies the function managing unit 1033 of the operation member and a raise in the priority of the corresponding function.

Figure 21:
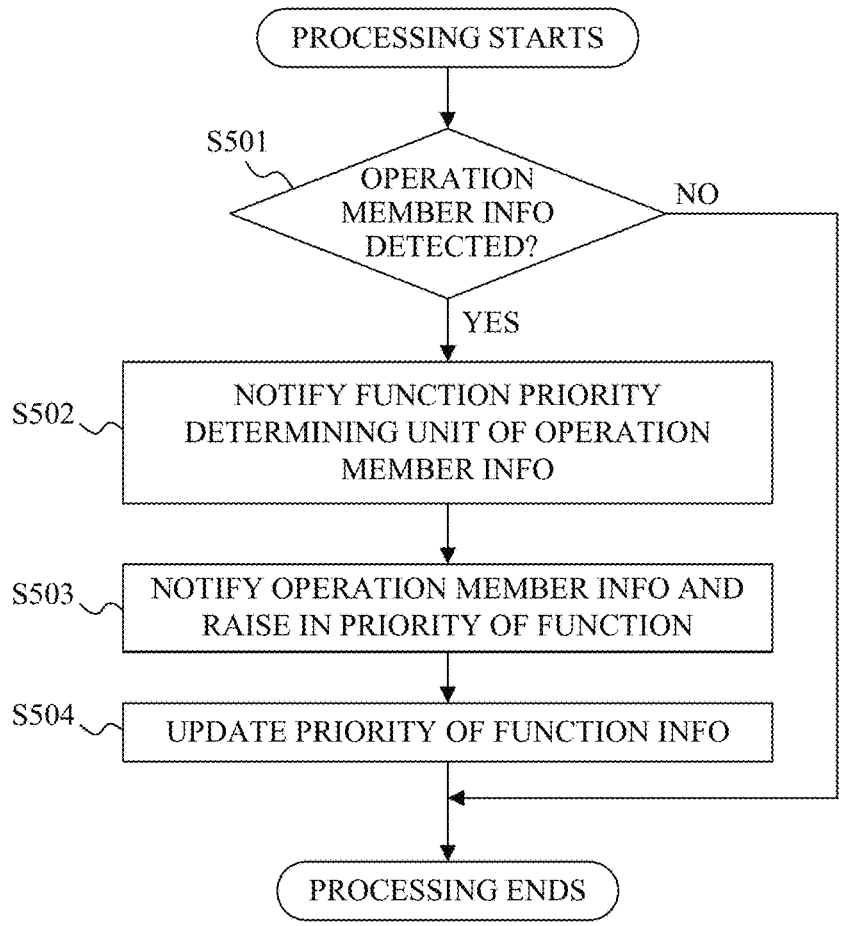
FIG. 21 is a flowchart illustrating function priority determining processing according to the third embodiment.

Referring now to FIG. 21, a description will be given of processing (function priority determining processing) until the function priority determining unit 1035 notifies the function managing unit 1033 of the priority in a case where an operator has a plurality of functions. FIG. 21 is a flowchart illustrating the function priority determining processing.

First, in step S501, the operation state detector 1034 determines whether operation member information has been detected. In a case where it is determined that operation member information has been detected, the flow proceeds to step S502. On the other hand, in a case where it is determined that no operation member information has been detected, the flow ends. Step S501 is executed every time the operation member is connected to the lens apparatus 100.

In step S502, the operation state detector 1034 notifies the function priority determining unit 1035 of the operation member information. Next, in step S503, the function priority determining unit 1035 notifies the function managing unit 1033 of the operation member information and changing of the priority of the function (a raise in the priority of the function). Next, in step S504, the function managing unit 1033 updates the priority of the function corresponding to the operation member information about the function information, and the flow ends.

Referring now to FIGS. 22A and 22B, a description will be given of an example of function priority determining processing by the function managing unit 1033. The function priority determining processing is processing for determining the priority of functions. FIG. 22A illustrates the function information before the priority of the functions is changed, and FIG. 22B illustrates the function information after the priority of the functions is changed. The function managing unit 1033 manages prioritized function information in which functions are prioritized.

In an example according to this embodiment, the function managing unit 1033 specifies the function from the function table and maintains the priority as illustrated in FIG. 22A. As described with reference to FIG. 21, in a case where the function managing unit 1033 receives a notification from the function priority determining unit 1035, for example, that the priority of the zoom operation apparatus (wired) has raised, the function managing unit 1033 increases the priority of the angle-of-view adjustment, which was 3, to 1, and decreases the priority of focusing and luminance adjustment by 1 each. Thus, the priority of the functions is changed in the order illustrated in FIG. 22B.

As described above, the function managing unit 1033 dynamically manages the priority of functions. Dynamically managing the priority of functions can provide optimal display according to the priority of functions. For example, displaying only information necessary for a high-priority function or emphasizing it can provide the operator with display of necessary information in an easy-to-read manner.

Although this embodiment illustrates an example in which the priority is determined based on the operation state of the operation member, this embodiment is not limited to this example, and the priority may be determined based on other information. For example, in a case where a zoom operation apparatus (wired) is connected, the priority may be determined based on the connection state of the operation member, such as raising of the priority of the angle-of-view adjustment. The priority may be determined according to the operator's imaging state, such as raising of the priority of focusing, in a case where AF cannot provide an in-focus state. The priority may be determined based on whether a predetermined time has elapsed, such as lowering the priority of a function over time whose priority has temporarily been raised.

This embodiment has described an example of dynamically managing the priority within the function of one operator, but is not limited to this example. The priorities may influence each other by considering a plurality of operators (a plurality of units). For example, in a case where the focus is operated by two operators, the priority of focusing of the other unit may be raised according to the operation by the other operator. That is, in a case where a function is shared by a plurality of operators, the priority may be determined based on the operation states of the plurality of operators. This embodiment has described an example in which the priority is automatically determined, but is not limited to this example. For example, the priority may be set by the user. In this embodiment, the lens apparatus 100 performs the function priority determining processing, but this embodiment is not limited to this example. For example, the camera apparatus 200 or the operation apparatus 300 may perform the function priority determining processing.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can display necessary information on a display unit appropriate for the operator, according to the display ability of the display unit or the function of the operator. Therefore, each embodiment can provide a control apparatus, an image pickup system, a control method, and a storage medium, each of which is beneficial in terms of the operability of the imaging unit, for example.

This application claims the benefit of Japanese Patent Application No. 2022-196016, filed on Dec. 8, 2022, and Japanese Patent Application No. 2022-196018, filed on Dec. 8, 2022, which are hereby incorporated by reference herein in their entirety.

What is claimed is:

1. A control apparatus configured to communicate with an imaging unit including a display unit, the control apparatus comprising:
   a memory storing instructions; and
   a processor configured to execute the instructions to:
      communicate with the imaging unit;
      generate display data for the display unit based on:
         information about an operation of the imaging unit acquired through communication with the imaging unit;
         a function of the operation corresponding to the information about the operation; and
         priority of the function of the operation;
      determine the priority of the function based on an operating state of the imaging unit; and
      transmit the display data for the display unit to the imaging unit.

2. The control apparatus according to claim 1, wherein the information about the operation includes information indicating a position of the imaging unit.

3. The control apparatus according to claim 1, wherein the information about the operation includes information about a function of the imaging unit.

4. The control apparatus according to claim 1, wherein the information about the operation includes information about the operation state of the imaging unit.

5. The control apparatus according to claim 1, wherein the information about the operation includes information about a setting of the imaging unit.

6. An image pickup system comprising:
   the control apparatus according to claim 1; and
   the imaging unit.

7. The image pickup system according to claim 6, wherein:
   the control apparatus is included in one of a lens apparatus, an image pickup apparatus, an operating apparatus, a display apparatus, or a video engineering apparatus, and
   the imaging unit is included in another of the lens apparatus, the image pickup apparatus, the operating apparatus, the display apparatus, or the video engineering apparatus.

8. A control apparatus configured to communicate with an imaging unit including a display unit, the control apparatus comprising:
   a memory storing instructions; and
   a processor configured to execute the instructions to:
      communicate with the imaging unit;
      generate display data for the display unit based on:
         information about an operation of the imaging unit acquired through communication with the imaging unit;
         a function of the operation corresponding to the information about the operation; and
         priority of the function of the operation;
      determine the priority of the function based on an imaging state; and
      transmit the display data for the display unit to the imaging unit.

9. The control apparatus according to claim 8, wherein the information about the operation includes information indicating a position of the imaging unit.

10. The control apparatus according to claim 8, wherein the information about the operation includes information about a function of the imaging unit.

11. The control apparatus according to claim 8, wherein the information about the operation includes information about an operation state of the imaging unit.

12. The control apparatus according to claim 8, wherein the information about the operation includes information about a setting of the imaging unit.

13. An image pickup system comprising:
   the control apparatus according to claim 8; and
   the imaging unit.

14. The image pickup system according to claim 13, wherein:
   the control apparatus is included in one of a lens apparatus, an image pickup apparatus, an operating apparatus, a display apparatus, or a video engineering apparatus, and
   the imaging unit is included in another of the lens apparatus, the image pickup apparatus, the operating apparatus, the display apparatus, or the video engineering apparatus.

* * * * *